(12) United States Patent
Griffin et al.

(10) Patent No.: US 12,418,590 B2
(45) Date of Patent: Sep. 16, 2025

(54) MINIMUM VIABLE CHARGE EXCHANGE FOR SERVICE OPERATIONS IN EDGE DEVICES

(71) Applicant: Red Hat, Inc., Raleigh, NC (US)

(72) Inventors: Leigh Griffin, Waterford (IE); Pierre-Yves Chibon, Puteaux (FR)

(73) Assignee: Red Hat, Inc., Raleigh, NC (US)

( * ) Notice: Subject to any disclaimer, the term of this patent is extended or adjusted under 35 U.S.C. 154(b) by 330 days.

(21) Appl. No.: 18/151,053

(22) Filed: Jan. 6, 2023

(65) Prior Publication Data

US 2024/0236188 A1 Jul. 11, 2024

(51) Int. Cl.
*H04L 67/125* (2022.01)
*H02J 7/00* (2006.01)
*H04L 67/10* (2022.01)

(52) U.S. Cl.
CPC .......... *H04L 67/125* (2013.01); *H02J 7/0048* (2020.01); *H04L 67/10* (2013.01)

(58) Field of Classification Search
CPC .................................................. H04L 67/125
See application file for complete search history.

(56) References Cited

U.S. PATENT DOCUMENTS

| | | | |
|---|---|---|---|
| 10,866,798 B2 | 12/2020 | Nolan et al. | |
| 10,879,741 B2 | 12/2020 | Soryal et al. | |
| 11,792,259 B1 * | 10/2023 | Paczkowski | H04L 67/10 709/201 |
| 2016/0164960 A1 * | 6/2016 | Marinelli | H04L 67/60 709/201 |
| 2018/0048987 A1 | 2/2018 | Morris | |
| 2021/0349512 A1 | 11/2021 | Guim Bernat et al. | |
| 2022/0191051 A1 | 6/2022 | Sabella et al. | |

(Continued)

FOREIGN PATENT DOCUMENTS

WO 2013142720 A1 9/2013

OTHER PUBLICATIONS

Molefi, Makhetha, et al., "Wireless Power Transfer for IoT Devices—A Review," 2019 International Multidisciplinary Information Technology and Engineering Conference (IMITEC), doi: 10.1109/IMITEC45504.2019.9015869, https://www.researchgate.net/publication/339554091, Nov. 2019, 9 pages.

(Continued)

*Primary Examiner* — Frantz B Jean
(74) *Attorney, Agent, or Firm* — Dority & Manning, P.A.

(57) ABSTRACT

A computing device determines that an action should be performed on a first edge device operating in a computing system. The computing device accesses a data structure that identifies values of computing resources of the first edge device and computational requirements of performing the action on the first edge device. The computing device determines, based on the data structure, that the first edge device lacks a computing resource to meet the computational requirements of performing the action on the first edge device. In response to determining that the first edge device lacks the computing resource to meet the computational requirements of performing the action on the first edge device, the computing device inhibits the action from being performed on the first edge device.

20 Claims, 9 Drawing Sheets

(56) References Cited

U.S. PATENT DOCUMENTS

2023/0249580 A1* 8/2023 Osawa .............. H02J 7/007182
 320/109

OTHER PUBLICATIONS

Author Unknown, "Understanding edge computing," https://www.redhat.com/en/topics/edge-computing/what-is-edge-computing, accessed online Jan. 4, 2022, 10 pages.

Author Unknown, "What is edge computing?", https://www.redhat.com/en/topics/edge-computing, accessed online Jan. 4, 2022, 7 pages.

* cited by examiner

MINIMUM VIABLE CHARGE EXCHANGE FOR SERVICE OPERATIONS IN EDGE DEVICES

BACKGROUND

Edge devices are computing devices in a computing system or network that are located at the edge of the computing system or network. Edge devices may be low power and require adaptive charge sharing in order to perform certain operations, however, adaptive charge sharing may not correlate to the intended operation, leaving an edge device inoperable.

SUMMARY

The examples disclosed herein implement a charge exchange service that performs minimum viable charge exchange for service operations in edge devices. In particular, the charge exchange service can correlate the time an operation or action takes to occur and the battery expenditure required to power the edge device for the duration of the operation or action. The charge exchange service can identify the minimum viable battery charge for the edge device and determine whether the battery expenditure required to perform the intended operation or action will leave the edge device with the minimum viable battery charge for the edge device.

In one example, a method for minimum viable charge exchange for service operations in edge devices is provided. The method includes determining, by a computing device, that an action should be performed on a first edge device operating in a computing system. The method further includes accessing, by the computing device, a data structure that identifies values of computing resources of the first edge device and computational requirements of performing the action on the first edge device. The method further includes determining, by the computing device based on the data structure, that the first edge device lacks a computing resource to meet the computational requirement of performing the action on the first edge device. The method further includes, in response to determining that the first edge device lacks the computing resource to meet the computational requirement of performing the action on the first edge device, inhibiting, by the computing device, the action from being performed on the first edge device.

In another example, a computing device for minimum viable charge exchange for service operations in edge devices is provided. The computing device includes a memory and a processor device coupled to the memory. The processor device is to determine that an action should be performed on a first edge device operating in a computing system. The processor device is further to access a data structure that identifies values of computing resources of the first edge device and computational requirements of performing the action on the first edge device. The processor device is further to determine, based on the data structure, that the first edge device lacks a computing resource to meet the computational requirement of performing the action on the first edge device. The processor device is further to, in response to determine that the first edge device lacks the computing resource to meet the computational requirement of performing the action on the first edge device, inhibit the action from being performed on the first edge device.

In another example, a non-transitory computer-readable storage medium is provided. The non-transitory computer-readable storage medium includes computer-executable instructions to cause a processor device to determine that an action should be performed on a first edge device operating in a computing system. The instructions further cause the processor device to access a data structure that identifies values of computing resources of the first edge device and computational requirements of performing the action on the first edge device. The instructions further cause the processor device to determine, based on the data structure, that the first edge device lacks a computing resource to meet the computational requirement of performing the action on the first edge device. The instructions further cause the processor device to, in response to determine that the first edge device lacks the computing resource to meet the computational requirement of performing the action on the first edge device, inhibit the action from being performed on the first edge device.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
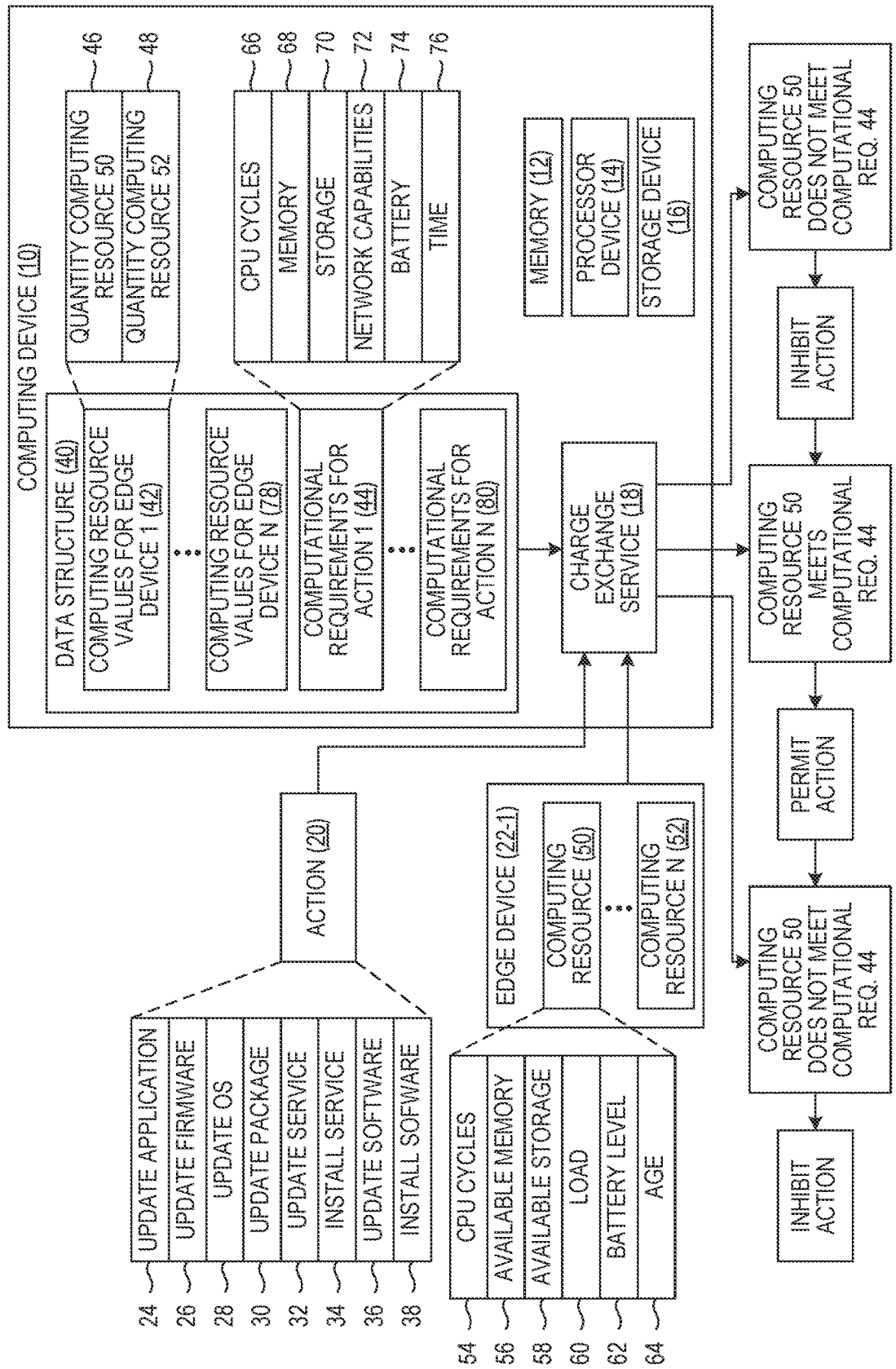
FIG. 1 is a block diagram of a computing device in which examples of minimum viable charge exchange for service operations in edge devices may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the elements unless otherwise explicitly specified. The word "or" as used herein and in the claims is inclusive unless contextually impossible. As an example, the recitation of A or B means A, or B, or both A and B. The word "data" may be used herein in the singular or plural depending on the context.

Edge devices are computing devices that operate at the edge of a computing system or network, near a user or data source rather than a centralized data center or cloud. Edge devices may be Internet of Things (IOT) devices or gateways, computer networking devices, automobiles, smart devices, smart displays, or any computing device that is located at the edge of a network and contains hardware, such as memory, a processor, storage, and computing resources, to run services and collect and process data. Edge devices may also be referred to as fog devices, and edge devices and fog devices may be components of edge computing. It is to be understood that the examples herein are not limited to edge devices and an edge device may be a fog device or any computing device that operates at the edge of a computing system or network near a user or data source.

Edge devices in a computing system or network may be characterized as being low power. As a result, edge devices require a power source or other form of charge or power in order to operate in a computing system or network. In some cases, an action, such as updating or installing a component on an edge device, may result in reducing the power level of the edge device to a level below a minimum viable charge for the edge device, where the edge device can no longer operate in the computing system or network. In some cases, edge devices may require adaptive charge sharing with other edge devices in the computing system or network in order to complete the action. However, if an incorrect amount of power is transferred, then the edge device transferring power may need more battery charge to be able to stay out in the field and the edge device receiving power may not receive enough power to successfully complete the action. These power exchanges do not correlate to the intended action, causing inefficiencies in the edge devices that comprise a computing system or network.

When an edge device intends to perform an action that requires battery power, such as installing or updating a component of the edge device, a charge exchange service can determine whether the action will consume an amount of battery power in excess of the minimum viable charge for the edge device that allows the edge device to remain operational after the action is completed. As a result, the edge device can perform the action if the charge exchange service determines that the action will consume an amount of battery that leaves the edge device with at least the minimum viable charge for the edge device, and the edge device cannot perform the action if the charge exchange service determines that the action will consume an amount of battery that will leave the edge device with less than the minimum viable charge for the edge device.

The charge exchange service can determine whether the action will consume an amount of another computing resource of the edge device, such as memory or storage, that will render the edge device inoperable. As a result, the edge device can perform the action if the charge exchange service determines that the action will consume an amount of a computing resource that leaves the edge device with an amount of the computing resource that allows the edge device to operate, or the edge device cannot perform the action if the charge exchange service determines that the action will consume an amount of the computing resource that will leave the edge device with less than the amount of the computing resource that will allow the edge device to operate.

In order to determine whether the action will consume an amount of battery power in excess of the minimum viable charge for the edge device, or in excess of an amount of another computing resource of the edge device that will render the edge device inoperable, the charge exchange service can access a data structure, such as a table, that identifies the edge devices in the computing system or network, the values of the computing resources of the edge devices, and the computational requirements, such as battery power required, for actions that can be performed on the edge device. The values of the computing resources of the edge devices and the computational requirements for actions that can be performed on the edge device can be determined by testing and running the edge device in production, monitoring the battery and CPU cycles of the edge device, taking key measurements of computing resources around the action, and in other manners that allow for measuring the computing resources of edge devices and actions that can be performed on edge devices. The data structure can be updated over time as edge devices age and computational task intensity changes, with the hardware profile being generated and made available, allowing for better design and strategies around updates.

The charge exchange service can also transfer battery power between edge devices in the computing system or network when an edge device in the computing system or network does not have enough battery power to perform the action and another edge device in the computing system or network has an amount of battery power in excess of the amount of battery power needed to operate in the computing system or network. Based on the information in the data structure, the edge device with an amount of battery power in excess of the amount of battery power needed to operate can share battery with the edge device that does not have enough battery power to perform the action, in an amount that will allow both edge devices to operate.

FIG. 1 is a block diagram of a computing device 10 that comprises a system memory 12, a processor device 14, and a storage device 16 in which examples of minimum viable charge exchange for service operations in edge devices may be practiced. It is to be understood that the computing device 10 in some examples may include constituent elements in addition to those illustrated in FIG. 1. In the example of FIG. 1, the computing device 10 implements a charge exchange service 18 that performs minimum viable charge exchange for service operations in edge devices.

The charge exchange service 18 may determine that an action 20 should be performed on a first edge device 22-1 that is operating in a computing system or network. In some examples, the action 20 may be to update an application 24, update firmware 26, update the operating system 28, update a package 30, update a service 32, install a service, 34, update software 36, or install software 38 on the first edge device 22-1, as non-limiting examples.

The charge exchange service 18 can access a data structure 40 that identifies computing resource values 42 of the first edge device 22-1 and computational requirements 44 of performing the action 20 on the first edge device 22-1. The data structure 40 may be any data structure that contains data about the computing resource values 42 of the first edge device 22-1 and the computational requirements 44 of performing the action 20 on the first edge device 22-1, such as a table, array, record, hash map, dictionary, list, linked list, graph, or tree, as non-limiting examples.

The computing resource values 42 of the first edge device 22-1 may identify quantities of computing resources of the first edge device 22-1. The computing resource values 42 of the first edge device 22-1 may contain multiple entries that correlate to the quantities of multiple computing resources of the first edge device 22-1. For example, the computing resource values 42 of the first edge device 22-1 may contain a quantity of a computing resource 46 of the first edge device 22-1 and a quantity of a computing resource 48 of the first edge device 22-1. The quantity of a computing resource 46 of the first edge device 22-1 may correlate to a computing resource 50 of the first edge device 22-1 and the quantity of a computing resource 48 of the first edge device 22-1 may correlate to a computing resource 52 of the first edge device 22-1. A computing resource (e.g., the computing resource 50, the computing resource 52) of the first edge device 22-1 may be one or more of CPU cycles 54, available memory 56, available storage 58, load 60, battery level 62, or age 64 of the first edge device 22-1, as non-limiting examples, the quantities of which can be represented in the computing resource values 42 of the first edge device 22-1 in the data structure 40. For example, the computing resource 50 of the first edge device 22-1 may be the battery level 62 of the first edge device 22-1 with a value of 20%, which can be signified in the quantity of a computing resource 46 of the first edge device 22-1 indicated in the computing resource values 42 of the first edge device 22-1 of the data structure 40. In another example, the computing resource 50 of the first edge device 22-1 may be the battery level 62 of the first edge device 22-1 with a value of 20%, which can be indicated in the quantity of a computing resource 46 of the first edge device 22-1 of the computing resource values 42 of the first edge device 22-1, and the computing resource 52 of the first edge device 22-1 may be the available memory 56 of the first edge device 22-1 with a value of 2 GB, which can be indicated in the quantity of a computing resource 48 of the first edge device 22-1 of the computing resource values 42 of the first edge device 22-1.

The computational requirements 44 of performing the action 20 on the first edge device 22-1 may be one or more of CPU cycles 66, memory 68, storage 70, network capabilities 72, battery 74, or time 76 required to perform the action 20 on the first edge device 22-1, as non-limiting examples. For example, the action 20 to perform on the first edge device 22-1 may be to update software 36 and the computational requirements 44 of performing the action 20 on the first edge device 22-1 may indicate that in order to update software 36, the memory 68 required is 1 GB, the storage 70 required is 5 GB, and the battery 74 required is 10%.

The data structure 40 may identify the values of computing resources of a plurality of edge devices operating in the computing system or the network. Computing resource values 78 of an edge device from among the plurality of edge devices may be identified in the data structure 40. The computing resource values 78 of an edge device from among the plurality of edge devices can indicate the quantities of computing resources of an edge device from among the plurality of edge devices. For example, computing resource values 78 of an edge device may identify quantities of computing resources of the edge device, such as one or more of CPU cycles, available memory, available storage, load, battery level, and age of the edge device, as non-limiting examples. The data structure 40 may contain an entry (e.g., the computing resource values 78 of an edge device) for each edge device in the plurality of edge devices that identifies the computing resource values for the edge device in the form of the quantities of the computing resources of the edge device.

The data structure 40 may identify the computational requirements of performing actions on the plurality of edge devices operating in the computing system or the network. Computational requirements 80 of performing an action on an edge device from among the plurality of edge devices may be identified in the data structure 40. The computational requirements 80 of performing an action on an edge device from among the plurality of edge devices can indicate one or more of the CPU cycles, memory, storage, network capabilities, battery, or time required to perform the action, such as updating an application, updating firmware, updating the operating system, updating a package, updating a service, installing a service, updating software, or installing software on the edge device from among the plurality of edge devices, as non-limiting examples. The data structure 40 may contain an entry (e.g., the computational requirements 80 of performing an action) for each action (e.g., the action 20) that can be performed on each edge device from among the plurality of edge devices.

The charge exchange service 18 may determine, based on the data structure 40, that the first edge device 22-1 lacks a computing resource (e.g., the computing resource 50) sufficient to meet the computational requirements 44 of performing the action 20 on the first edge device 22-1. The charge exchange service 18 may then inhibit the action 20 from being performed on the first edge device 22-1. For example, the computing resource 50 of the first edge device 22-1 may be the battery level 62 of the first edge device 22-1 with a value of 20%, which may be identified in the quantity of a computing resource 46 of the first edge device 22-1 in the computing resource values 42 of the first edge device 22-1 of the data structure 40. The computational requirements 44 of performing the action 20 on the first edge device 22-1 may indicate that the action 20 requires 25% of the battery of the first edge device 22-1. The charge exchange service 18 can then determine that the battery level 62 of the first edge device 22-1 (i.e., computing resource 50) does not meet the computational requirements 44 of performing the action 20 on the first edge device 22-1 because the action 20 requires 25% battery but the first edge device 22-1 has 20% battery, and inhibit the action 20 from being performed on the first edge device 22-1 as a result.

In some examples, the data structure 40 may contain rules that identify a safe level of a computing resource (e.g., computing resource 50, computing resource 52), where the charge exchange service 18 will not allow the edge device to perform an action that will reduce the computing resource to an amount below the safe level. The safe level may be the lowest level of a computing resource that allows the edge device to remain operational in the computing system or network or a level of a computing resource that keeps the edge device from overheating, as non-limiting examples.

For example, the computing resource values 42 of the first edge device 22-1 may indicate that the safe level of battery percentage for the first edge device is 25% and the computational requirements 44 of performing the action 20 on the first edge device 22-1 may indicate that the action 20 requires an amount of battery that will reduce the battery of the first edge device 22-1 to an amount below the 25% safe level of battery percentage for the first edge device 22-1, so the charge exchange service 18 will not allow the first edge device 22-1 to perform the action. In another example, the computing resource values 42 of the first edge device 22-1 may indicate that the safe level of available memory 56 of the first edge device 22-1 is 1 GB and the computational requirements 44 of performing the action 20 on the first edge device 22-1 may indicate that the action 20 requires an amount of memory that will reduce the amount of available memory 56 to an amount below the 1 GB safe level of memory for the first edge device 22-1, so the charge exchange service 18 will not allow the first edge device 22-1 to perform the action 20.

In another example, subsequent to inhibiting the action 20 from being performed on the first edge device 22-1, the charge exchange service 18 may determine, based on the data structure 40, that the first edge device 22-1 has a computing resource (e.g., the computing resource 50) sufficient to meet the computational requirements 44 of performing the action 20 on the first edge device 22-1. The charge exchange service 18 may then permit the action 20 to be performed on the first edge device 22-1. For example, the computing resource 50 of the first edge device 22-1 may be the battery level 62 of the first edge device 22-1 with a value of 90%, which may be identified in the quantity of a computing resource 46 of the first edge device 22-1 in the computing resource values 42 of the first edge device 22-1 of the data structure 40. The computational requirements 44 of performing the action 20 on the first edge device 22-1 may indicate that the action 20 requires 25% of the battery of the first edge device 22-1. The charge exchange service 18 can then determine that the battery level 62 of the first edge device 22-1 (i.e., computing resource 50) meets the computational requirements 44 of performing the action 20 on the first edge device 22-1 because the action 20 requires 25% battery and the first edge device 22-1 has 90% battery, and permit the action 20 to be performed on the first edge device 22-1 as a result. In another example, the charge exchange service 18 may determine, based on the data structure 40, that the first edge device 22-1 has a computing resource (e.g., the computing resource 50) sufficient to meet the computational requirements 44 of performing the action 20 on the first edge device 22-1, and permit the action 20 to be performed on the first edge device 22-1 as a result.

In another example, subsequent to permitting the action 20 to be performed on the first edge device 22-1, the charge exchange service 18 may determine that the first edge device 22-1 lacks a computing resource (e.g., the computing resource 50) sufficient to meet the computational requirements 44 of performing the action 20 on the first edge device 22-1. The charge exchange service may then inhibit the action 20 from being performed on the first edge device 22-1. For instance, the charge exchange service 18 may determine, based on the data structure 40, that the first edge device 22-1 has a quantity of the computing resource 50 that is sufficient to meet the computational requirements 44 of performing the action 20 on the first edge device 22-1 and permit the first edge device 22-1 to perform the action 20, and then a condition in the computing system, network, computing device, or edge device (e.g., the first edge device 22-1) may occur which changes the quantity of the computing resource 50. As a result, the charge exchange service 18 may determine that the first edge device 22-1 lacks the computing resource 50 sufficient to meet the computational requirements 44 of performing the action 20 on the first edge device 22-1, and inhibit the first edge device 22-1 from continuing to perform the action 20 as a result. For example, the computing resource 50 of the first edge device 22-1 may be the battery level 62 of the first edge device 22-1 with a value of 90%, which may be identified in the quantity of a computing resource 46 of the first edge device 22-1 in the computing resource values 42 of the first edge device 22-1 of the data structure 40. The computational requirements 44 of performing the action 20 on the first edge device 22-1 may indicate that the action 20 requires 25% of the battery of the first edge device 22-1. The charge exchange service 18 can then determine that the battery level 62 of the first edge device 22-1 (i.e., computing resource 50) meets the computational requirements 44 of performing the action 20 on the first edge device 22-1 because the action 20 requires 25% battery and the first edge device 22-1 has 90% battery, and permit the action 20 to be performed on the first edge device 22-1 as a result. Then an event may occur before the action 20 is commenced or completed which reduces the battery of the first edge device 22-1 to 20%. The charge exchange service 18 may then pause or inhibit the action 20 from being performed on the first edge device 22-1 because the battery level 62 of the first edge device 22-1 (i.e., computing resource 50) no longer meets the computational requirements 44 of performing the action 20 on the first edge device 22-1, as the action 20 requires 25% battery and the first edge device 22-1 has 20% battery It is to be understood that, because the charge exchange service 18 is a component of the computing device 10, functionality implemented by the charge exchange service 18 may be attributed to the computing device 10 generally. Moreover, in examples where the charge exchange service 18 comprises software instructions that program the processor device 14 to carry out functionality discussed herein, functionality implemented by the charge exchange service 18 may be attributed herein to the processor device 14. It is to be further understood that while, for purposes of illustration only, the charge exchange service 18 is depicted as a single component, the functionality implemented by the charge exchange service 18 may be implemented in any number of components, and the examples discussed herein are not limited to any particular number of components.

Figure 2:
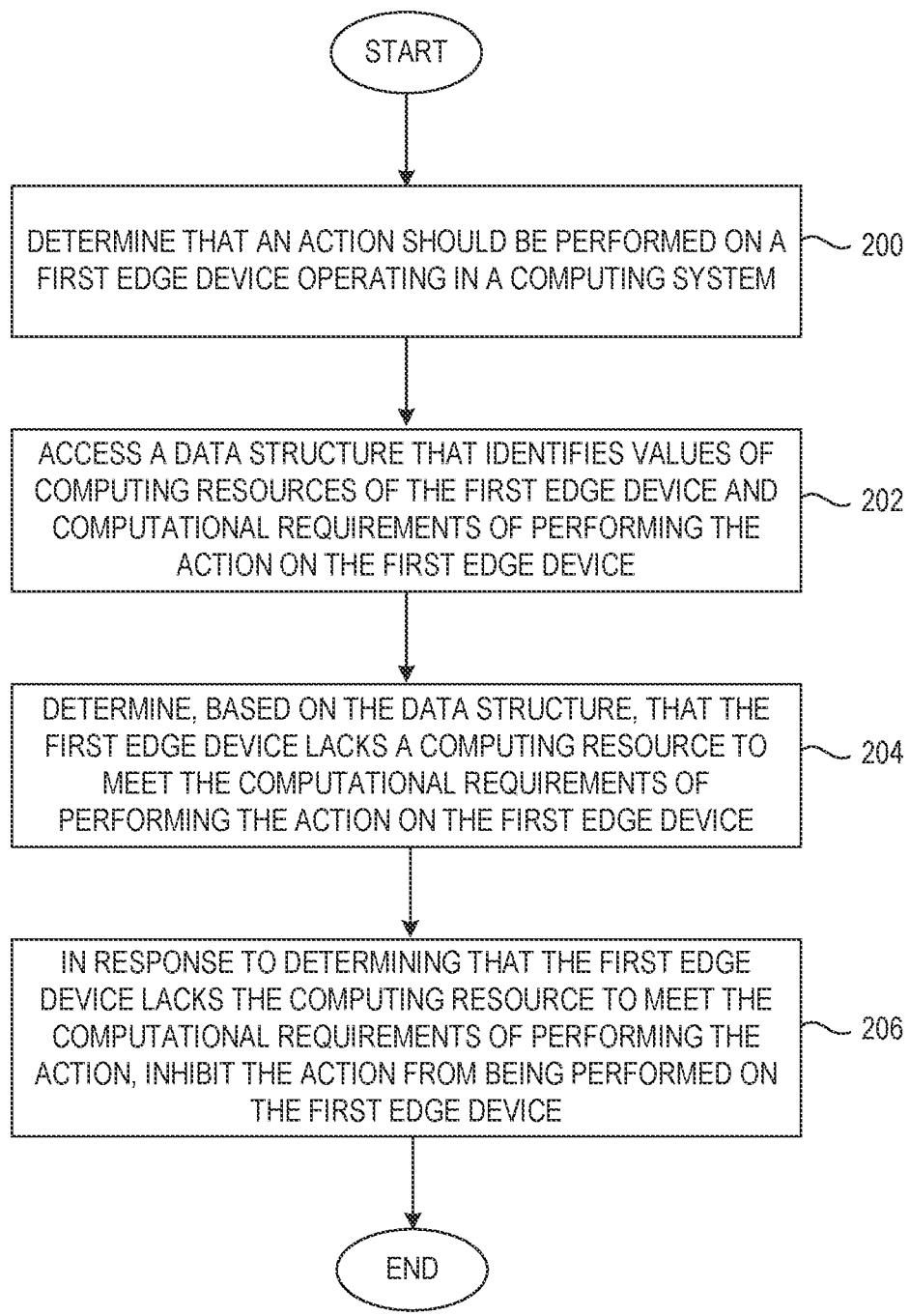
FIG. 2 is a flowchart illustrating operations performed by the computing device of FIG. 1 for minimum viable charge exchange for service operations in edge devices, according to one example.

FIG. 2 is a flowchart illustrating operations performed by the computing device of FIG. 1 for minimum viable charge exchange for service operations in edge devices, according to one example. Elements of FIG. 1 are referenced in describing FIG. 2 for the sake of clarity. In FIG. 2, operations begin with a processor device of a computing device, such as the processor device 14 of the computing device 10 of FIG. 1, determining that an action 20 should be performed on a first edge device 22-1 operating in a computing system (block 200). The processor device 14 then accesses a data structure 40 that identifies values of computing resources 42 of the first edge device 22-1 and computational requirements 44 of performing the action 20 on the first edge device 22-1 (block 202). The processor device 14 then determines, based on the data structure 40, that the first edge device 22-1 lacks a computing resource 50 sufficient to meet the computational requirements 44 of performing the action 20 on the first edge device 22-1 (block 204). The processor device 14 then, in response to determining that the first edge device 22-1 lacks the computing resource 50 sufficient to meet the computational requirements 44 of performing the action 20 on the first edge device 22-1, inhibits the action 20 from being performed on the first edge device 22-1 (block 206).

Figure 3:
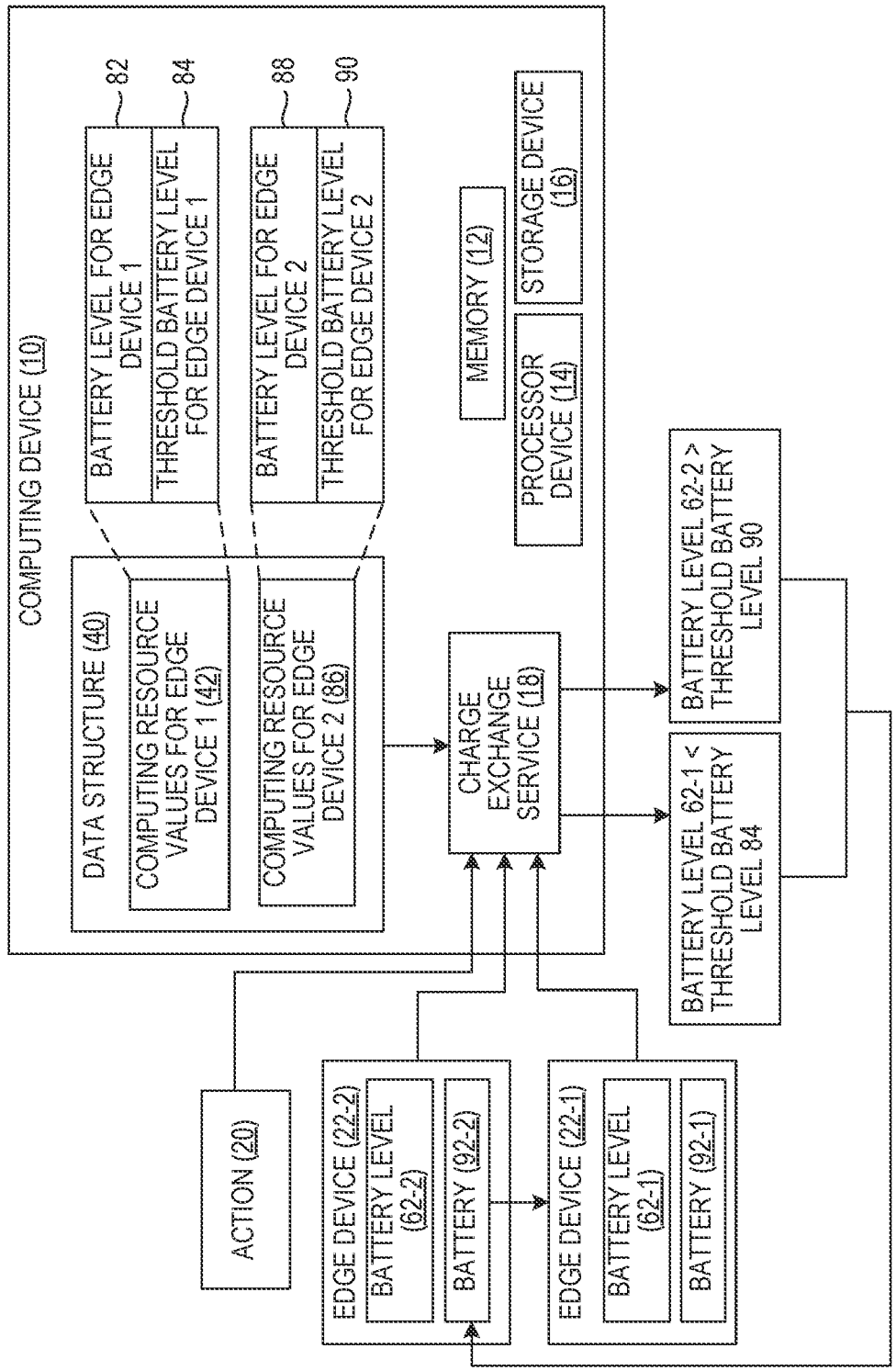
FIG. 3 is a block diagram of the computing device of FIG. 1 for minimum viable charge exchange for service operations in edge devices, according to one example.

FIG. 3 is a block diagram of the computing device of FIG. 1 for minimum viable charge exchange for service operations in edge devices, according to one example. Elements of FIG. 1 are referenced in describing FIG. 3 for the sake of clarity. In the example of FIG. 3, the charge exchange service 18 may, subsequent to inhibiting the action 20 from being performed on the first edge device 22-1, obtain the computing resource values 42 of the first edge device 22-1 from the data structure 40. The computing resource values 42 of the first edge device 22-1 may include a battery level 82 of the first edge device 22-1 and a threshold battery level 84 for the first edge device 22-1. In some examples, the battery level 82 of the first edge device 22-1 may be identified in the quantity of a computing resource 46 of the first edge device 22-1 and the threshold battery level 84 for the first edge device may be identified in the quantity of a computing resource 48 of the first edge device 22-1, both the quantity of a computing resource 46 of the first edge device 22-1 and the quantity of a computing resource 48 of the first edge device 22-1 being identified in the computing resource values 42 of the first edge device 22-1 of the data structure 40. The battery level 82 of the first edge device 22-1 may correlate to the computing resource 50 of the first edge device 22-1, where the computing resource 50 of the first edge device 22-1 is the battery level 62-1 of the first edge device 22-1.

The charge exchange service 18 may determine that the battery level 82 of the first edge device 22-1 is below the threshold battery level 84 for the first edge device 22-1. For example, the charge exchange service 18 may obtain the battery level 82 of the first edge device 22-1 from the computing resource values 42 of the first edge device 22-1 that indicates that the battery level 62-1 of the first edge device is 10% and obtain the threshold battery level 84 for the first edge device 22-1 from the computing resource values 42 of the first edge device 22-1 that indicates that the threshold battery level 84 for the first edge device 22-1 is 20%. Then the charge exchange service 18 can determine that the 10% battery level 62-1 of the first edge device 22-1 is below the 20% threshold battery level 84 for the first edge device 22-1.

The charge exchange service 18 may obtain computing resource values 86 of a second edge device 22-2 from the data structure 40. The computing resource values 86 of the second edge device 22-2 may include a battery level 88 of the second edge device 22-2 and a threshold battery level 90 for the second edge device 22-2. In some examples, the battery level 88 of the second edge device 22-2 may be identified in a first quantity of a computing resource of the second edge device and the threshold battery level 90 for the second edge device 22-2 may be identified in a second quantity of a computing resource of the second edge device, both the first quantity of a computing resource of the second edge device and the second quantity of a computing resource of the second edge device being identified in the computing resource values 86 of the second edge device of the data structure 40. The battery level 88 of the second edge device 22-2 may correlate to a computing resource of the second edge device 22-2, where the computing resource of the second edge device 22-2 is the battery level 62-2 of the second edge device 22-2.

The charge exchange service 18 may determine that the battery level 88 of the second edge device 22-2 is above the threshold battery level 90 for the second edge device 22-2. For example, the charge exchange service 18 may obtain the battery level 88 of the second edge device 22-2 from the computing resource values 86 of the second edge device 22-2 that indicates that the battery level 62-2 of the second edge device is 90% and obtain the threshold battery level 90 for the second edge device 22-2 from the computing resource values 86 of the second edge device 22-2 that indicates that the threshold battery level 90 for the second edge device 22-2 is 20%. Then the charge exchange service 18 can determine that the 90% battery level 62-2 of the second edge device 22-2 is above the 20% threshold battery level 90 for the second edge device 22-2.

The charge exchange service 18 may then cause the second edge device 22-2 to share energy from a battery 92-2 of the second edge device 22-2 with a battery 92-1 of the first edge device 22-1. For example, the charge exchange service 18 may obtain the computing resource values 42 of the first edge device 22-1 that identify the threshold battery level 84 for the first edge device 22-1 as 20% and the battery level 82 of the first edge device 22-1, which correlates to the battery level 62-1 of the first edge device 22-1, as 10%. The charge exchange service 18 may obtain the computing resource values 86 of the second edge device 22-2 that identify the threshold battery level 90 for the second edge device 22-2 as 20% and the battery level 88 of the second edge device 22-2, which correlates to the battery level 62-2 of the second edge device 22-2, as 90%. The charge exchange service 18 may determine that the 10% battery level 62-1 of the first edge device is below the 20% threshold battery level 84 for the first edge device 22-1 and the 90% battery level 62-2 of the second edge device 22-2 is above the 20% threshold battery level 90 for the second edge device 22-2. The charge exchange service 18 can determine that the second edge device 22-2 has a battery level of 70% available to transfer to another edge device in the computing system or network while remaining able to operate in the computing system or network because the threshold battery level 90 is 20% and the battery level 62-2 is 90%. The charge exchange service 18 can determine that the first edge device 22-1 requires at least 10% more battery level in order to reach the threshold battery level 84 because the battery level 62-1 is 10% and the threshold battery level 84 is 20%. The charge exchange service 18 can cause the second edge device 22-2 to share or transfer energy from the battery 92-2 of the second edge device 22-2 in an amount in the range of 10%-70% in order to bring the 10% battery level 62-1 of the first edge device 22-1 to a level at or above the 20% threshold battery level 84 for the first edge device 22-1 while keeping the battery level 88 for the second edge device 22-2 at or above the 20% threshold battery level 90 for the second edge device 22-2.

Figure 4:
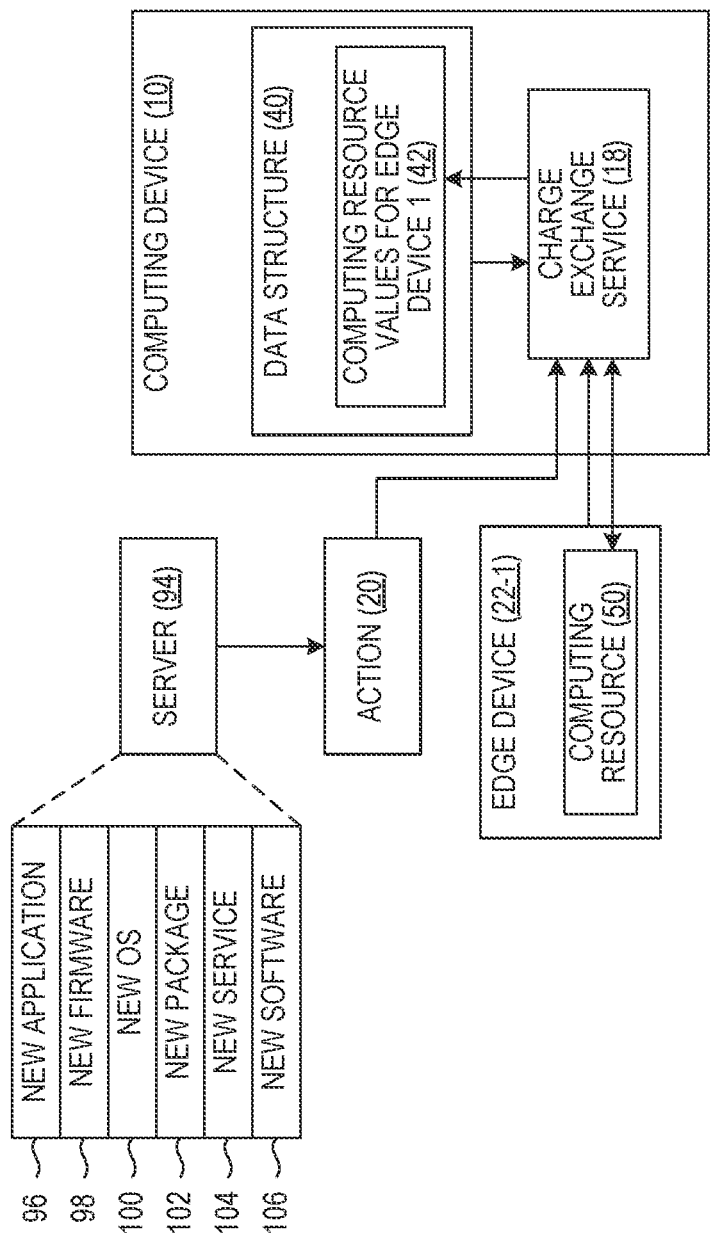
FIG. 4 is a block diagram of the computing device of FIG. 1 for minimum viable charge exchange for service operations in edge devices, according to one example.

FIG. 4 is a block diagram of the computing device of FIG. 1 for minimum viable charge exchange for service operations in edge devices, according to one example. Elements of FIG. 1 are referenced in describing FIG. 4 for the sake of clarity. In the example of FIG. 4, the charge exchange service 18 may receive a signal from a server 94 in order to determine that the action 20 should be performed on the first edge device 22-1. The signal may indicate that one or more of a new application 96, new firmware 98, new operating system 100, new package 102, new service 104, or new software 106, as non-limiting examples, are available for the first edge device 22-1 to install. The signal may indicate that one or more of a new version of an application, firmware, operating system, package, service, or software on the first edge device 22-1, as non-limiting examples, are available for the first edge device 22-1 to update. After determining that the action 20 should be performed on the first edge device 22-1, the charge exchange service 18 may determine the computing resource values 42 of the first edge device 22-1 by polling the first edge device 22-1. The charge exchange service 18 may then update the data structure 40 with the computing resource values 42 of the first edge device 22-1 that were obtained by polling the first edge device 22-1. For example, the charge exchange service 18 may receive a signal from the server 94 that indicates that new software 106 is available to install on the first edge device 22-1. The charge exchange service 18 may determine that the action 20 to be performed is to install the new software 106 on the first edge device 22-1. The charge exchange service 18 can then poll the first edge device 22-1 to determine the value of a computing resource 50 on the first edge device 22-1, such as the battery level of the first edge device 22-1. The charge exchange service 18 can update the computing resource values 42 of the first edge device 22-1 in the data structure 40 with the value of the computing resource 50 (e.g., the battery level) of the first edge device 22-1 that was obtained by polling the first edge device 22-1.

In some examples, the data structure 40 may be updated periodically (e.g., hourly or daily) with updated values for the computing resource values of the first edge device 22-1 and for the computational requirements 44 of performing the action 20 on the first edge device 22-1. The data structure 40 may also be updated periodically (e.g., hourly or daily) with updated computing resource values of other edge devices in the computing system or network and with updated computational requirements of performing actions on the edge devices in the computing system or network. In other examples, the data structure 40 may be updated when an edge device in the computing system or network (e.g., the first edge device 22-1) sends a notification to the charge exchange service 18 indicating that the battery level of the edge device is at the level of a predefined threshold, then the charge exchange service 18 can update the data structure 40 with the battery level of the edge device from the notification in the computing resource values (e.g., computing resource values 42, computing resource values 78) for the edge device. For example, edge devices in the computing system or network may be configured to send a notification to the charge exchange service 18 when the battery level of the edge device reaches 15%, then the charge exchange service 18 can update the computing resource values (e.g., computing resource values 42, computing resource values 78) for the edge device in the data structure 40 to indicate a 15% battery level when an edge device has 15% battery and sends a notification to the charge exchange service 18 that specifies the edge device has 15% battery.

In another example, an edge device in the computing system or network can send a signal to the charge exchange service 18 when the edge device reaches a predetermined battery threshold in order to determine whether any updates to the components of the edge device are available to install. For example, when an edge device reaches an 80% battery level, the edge device may send a signal to the charge exchange service 18 requesting an update to or a new version of an application, firmware, operating system, package, service, or software, as non-limiting examples, and the charge exchange service 18 may request the update or new version from the server 94. If the server 94 sends, and the charge exchange service 18 receives, a signal that a new version or update is available, then the new version or update can be preloaded or executed on the edge device.

Figure 5:
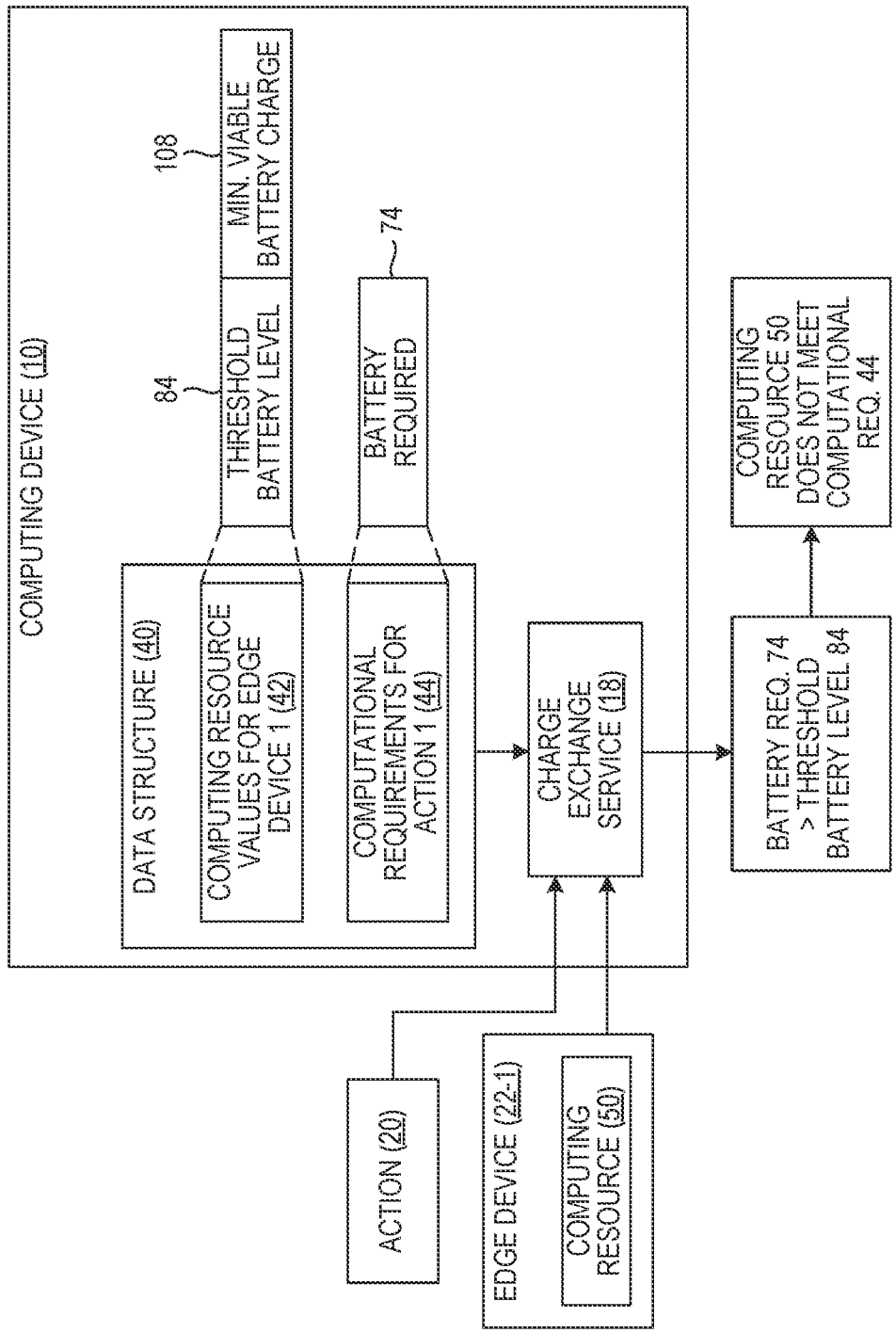
FIG. 5 is a block diagram of the computing device of FIG. 1 for minimum viable charge exchange for service operations in edge devices, according to one example.

FIG. 5 is a block diagram of the computing device of FIG. 1 for minimum viable charge exchange for service operations in edge devices, according to one example. Elements of FIG. 1 are referenced in describing FIG. 5 for the sake of clarity. In the example of FIG. 5, the charge exchange service 18 may obtain the computing resource values 42 of the first edge device 22-1 from the data structure 40. The computing resource values 42 of the first edge device 22-1 may include the threshold battery level 84 for the first edge device 22-1. The threshold battery level 84 for the first edge device 22-1 can indicate a minimum viable battery charge 108 for the first edge device 22-1. The minimum viable battery charge 108 for the first edge device 22-1 may identify the lowest amount of battery charge of the first edge device 22-1 that allows the first edge device 22-1 to operate in the computing system or network. The charge exchange service 18 may obtain the computational requirements 44 of performing the action 20 on the first edge device 22-1 from the data structure 40. The computational requirements 44 of performing the action 20 on the first edge device 22-1 may include the amount of battery 74 required to perform the action 20 on the first edge device 22-1. The charge exchange service 18 can determine that the amount of battery 74 required to perform the action 20 exceeds the threshold battery level 84 for the first edge device 22-1. The charge exchange service 18 may determine that the first edge device 22-1 lacks the computing resource 50 (e.g., the battery level of the first edge device 22-1) sufficient to meet the computational requirements 44 of performing the action 20 on the first edge device 22-1 if the charge exchange service 18 determines that the amount of battery 74 required to perform the action 20 exceeds the threshold battery level 84 for the first edge device 22-1.

For example, the charge exchange service 18 may obtain from the data structure 40 the computing resource values 42 of the first edge device 22-1 that indicates that the threshold battery level 84 for the first edge device 22-1 is 10%, where 10% is the minimum viable battery charge 108 for the first edge device 22-1 to be able to operate in the computing system or network. The charge exchange service 18 may obtain from the data structure 40 the computational requirements 44 of performing the action 20 on the first edge device 22-1 that indicates that performing the action 20 requires 15% of the battery of the first edge device 22-1. The computing resource 50 of the first edge device 22-1 may indicate that the battery level of the first edge device 22-1 is 20%. The charge exchange service 18 can then determine that the amount of battery 74 required to perform the action 20 exceeds the threshold battery level 84 for the first edge device 22-1 because the battery level of the first edge device 22-1 is 20%, the amount of battery 74 required to perform the action 20 is 15%, and the threshold battery level 84 for the first edge device 22-1 is 10%, so the action 20 cannot be performed without the battery level of the first edge device 22-1 falling below the threshold battery level 84 for the first edge device 22-1, which would leave the first edge device 22-1 inoperable in the computing system or network. The charge exchange service 18 can then determine that the first edge device 22-1 lacks the computing resource 50 (the battery level of the first edge device 22-1) sufficient to meet the computational requirements 44 of performing the action 20 on the first edge device 22-1.

Figure 6:
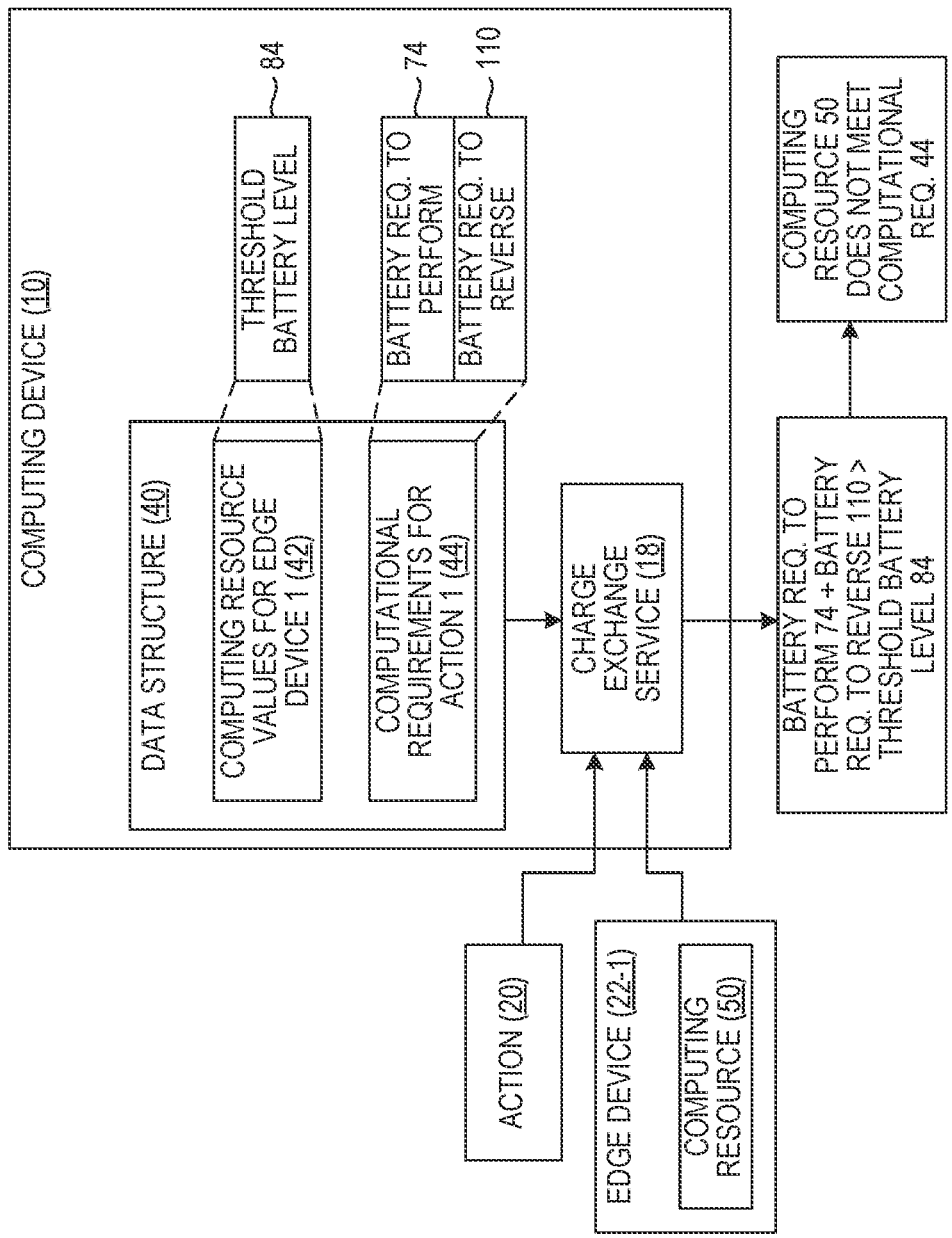
FIG. 6 is a block diagram of the computing device of FIG. 1 for minimum viable charge exchange for service operations in edge devices, according to one example.

FIG. 6 is a block diagram of the computing device of FIG. 1 for minimum viable charge exchange for service operations in edge devices, according to one example. Elements of FIG. 1 are referenced in describing FIG. 6 for the sake of clarity. In the example of FIG. 6, the charge exchange service 18 may obtain the computing resource values 42 of the first edge device 22-1 from the data structure 40. The computing resource values 42 of the first edge device 22-1 may include the threshold battery level 84 for the first edge device 22-1. The threshold battery level 84 for the first edge device 22-1 may identify the minimum viable battery charge 108 for the first edge device 22-1. The charge exchange service 18 may obtain the computational requirements 44 of performing the action 20 on the first edge device 22-1 from the data structure 40. The computational requirements 44 of performing the action 20 on the first edge device 22-1 may include the amount of battery 74 required to perform the action 20 on the first edge device 22-1 and an amount of battery required to reverse 110 the action 20 on the first edge device 22-1. The amount of battery required to reverse 110 the action 20 on the first edge device 22-1 may include the amount of battery required to roll back the action 20 and to reassert an older version of the component, such as the application, firmware, operating system, service, or software, to which the action 20 correlates. In other examples, the computing resource values 42 of the first edge device 22-1 may include quantities of other computing resources (e.g., computing resource 50, computing resource 52) on the first edge device 22-1, such as available memory 56 or available storage 58, and the computational requirements 44 of performing the action 20 on the first edge device 22-1 may include the amount of computing resources, such as memory 68 or storage 70, required to perform the action 20 on the first edge device 22-1 and to reverse the action 20 on the first edge device 22-1. The amount of the computing resources required to reverse the action 20 on the first edge device 22-1 may include the amount of computing resources required to roll back the action 20 and to reassert an older version of the component, such as the application, firmware, operating system, service, or software, to which the action 20 correlates.

The charge exchange service 18 may determine that the amount of battery 74 required to perform the action 20 on the first edge device 22-1 together with the amount of battery required to reverse 110 the action 20 on the first edge device 22-1 exceeds the threshold battery level 84 for the first edge device 22-1. The charge exchange service 18 may determine that the first edge device 22-1 lacks the computing resource 50 (e.g., the battery level of the first edge device 22-1) sufficient to meet the computational requirements 44 of performing the action 20 on the first edge device 22-1 if the charge exchange service 18 determines that the amount of battery 74 required to perform the action 20 on the first edge device 22-1 together with the amount of battery required to reverse 110 the action 20 on the first edge device 22-1 exceeds the threshold battery level 84 for the first edge device 22-1. As a result, the charge exchange service 18 can pause the action 20 or inhibit the action 20 from being performed on the first edge device 22-1.

For example, the charge exchange service 18 may obtain from the data structure 40 the computing resource values 42 of the first edge device 22-1 that indicates that the threshold battery level 84 for the first edge device 22-1 is 20%, where 20% is the minimum viable battery charge 108 for the first edge device 22-1 to be able to operate in the computing system or network. The charge exchange service 18 may obtain from the data structure 40 the computational requirements 44 of performing the action 20 on the first edge device 22-1 that indicates that the amount of battery 74 required to perform the action 20 on the first edge device 22-1 is 5% and the amount of battery required to reverse 110 the action 20 on the first edge device 22-1 is 10%. The computing resource 50 of the first edge device 22-1 may indicate that the battery level of the first edge device 22-1 is 25%. The charge exchange service 18 can then determine that the amount of battery 74 required to perform the action 20 together with the amount of battery required to reverse 110 the action 20 on the first edge device 22-1 exceeds the threshold battery level 84 for the first edge device 22-1 because the battery level of the first edge device 22-1 is 25%, the amount of battery 74 required to perform the action 20 is 5%, the amount of battery required to reverse 110 the action 20 is 10%, and the threshold battery level 84 for the first edge device 22-1 is 20%, so the action 20 cannot be performed and reversed, if necessary, without the battery level of the first edge device 22-1 falling below the threshold battery level 84 for the first edge device 22-1, which would leave the first edge device 22-1 inoperable in the computing system or network. The charge exchange service 18 can then determine that the first edge device 22-1 lacks the computing resource 50 (the battery level of the first edge device 22-1) sufficient to meet the computational requirements 44 of performing the action 20 on the first edge device 22-1.

Figure 7:
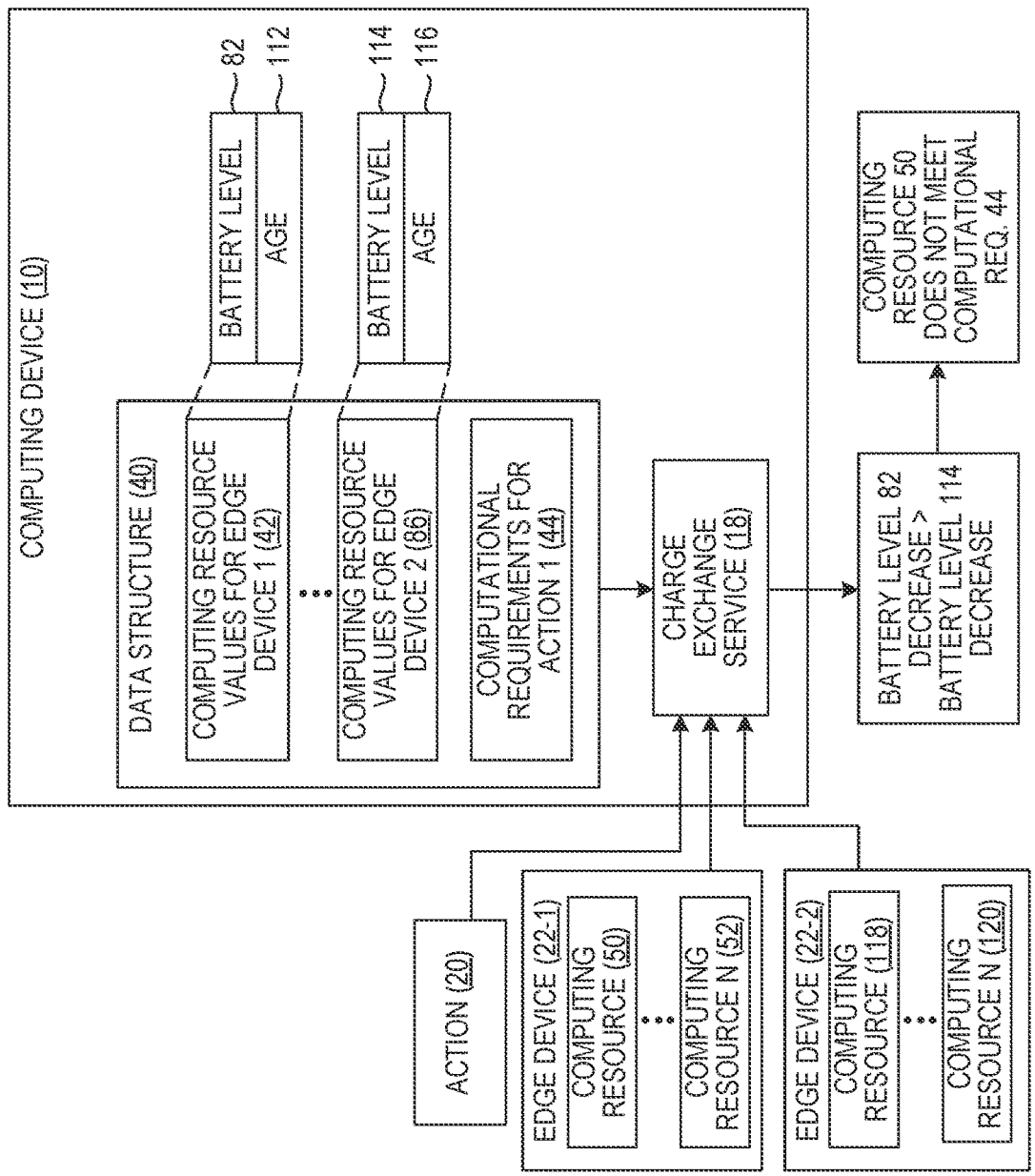
FIG. 7 is a block diagram of the computing device of FIG. 1 for minimum viable charge exchange for service operations in edge devices, according to one example.

FIG. 7 is a block diagram of the computing device of FIG. 1 for minimum viable charge exchange for service operations in edge devices, according to one example. Elements of FIG. 1 are referenced in describing FIG. 7 for the sake of clarity. In the example of FIG. 7, the charge exchange service 18 may obtain the computing resource values 42 of the first edge device 22-1 from the data structure 40. The computing resource values 42 of the first edge device 22-1 may contain multiple entries that correlate to the quantities of multiple computing resources (e.g., computing resource 50, computing resource 52) of the first edge device 22-1. The computing resource values 42 of the first edge device 22-1 may include the battery level 82 of the first edge device 22-1 and an age 112 of the first edge device 22-1. For instance, the battery level 82 may correlate to the computing resource 50 of the first edge device 22-1 and the age 112 may correlate to the computing resource 52 of the first edge device 22-1. The charge exchange service 18 may obtain the computing resource values 86 of the second edge device 22-2 from the data structure 40. The computing resource values 86 of the second edge device 22-2 may contain multiple entries that correlate to the quantities of multiple computing resources, such as a computing resource 118 and a computing resource 120 of the second edge device 22-2. The computing resource values 86 of the second edge device 22-2 may include a battery level 114 of the second edge device 22-2 and an age 116 of the second edge device 22-2. For instance, the battery level 114 may correlate to the computing resource 118 of the second edge device 22-2 and the age 116 may correlate to the computing resource 120 of the second edge device 22-2. The charge exchange service 18 can determine that the battery level 82 of the first edge device 22-1 decreases at a faster rate than the battery level 114 of the second edge device 22-2, based on the age 112 of the first edge device 22-1 and the age 116 of the second edge device 22-2. For instance, the age 112 of the first edge device 22-1 may be greater than the age 116 of the second edge device 22-2 and, as a result, the battery level 82 of the first edge device 22-1 may decrease faster than the battery level 114 of the second edge device 22-2. The charge exchange service 18 can determine that the first edge device 22-1 lacks the computing resource 50 (e.g., the battery level of the first edge device 22-1) sufficient to meet the computational requirements 44 of performing the action on the first edge device 22-1 if the battery level 82 of the first edge device 22-1 decreases at a faster rate than the battery level 114 of the second edge device 22-2.

Figure 8:
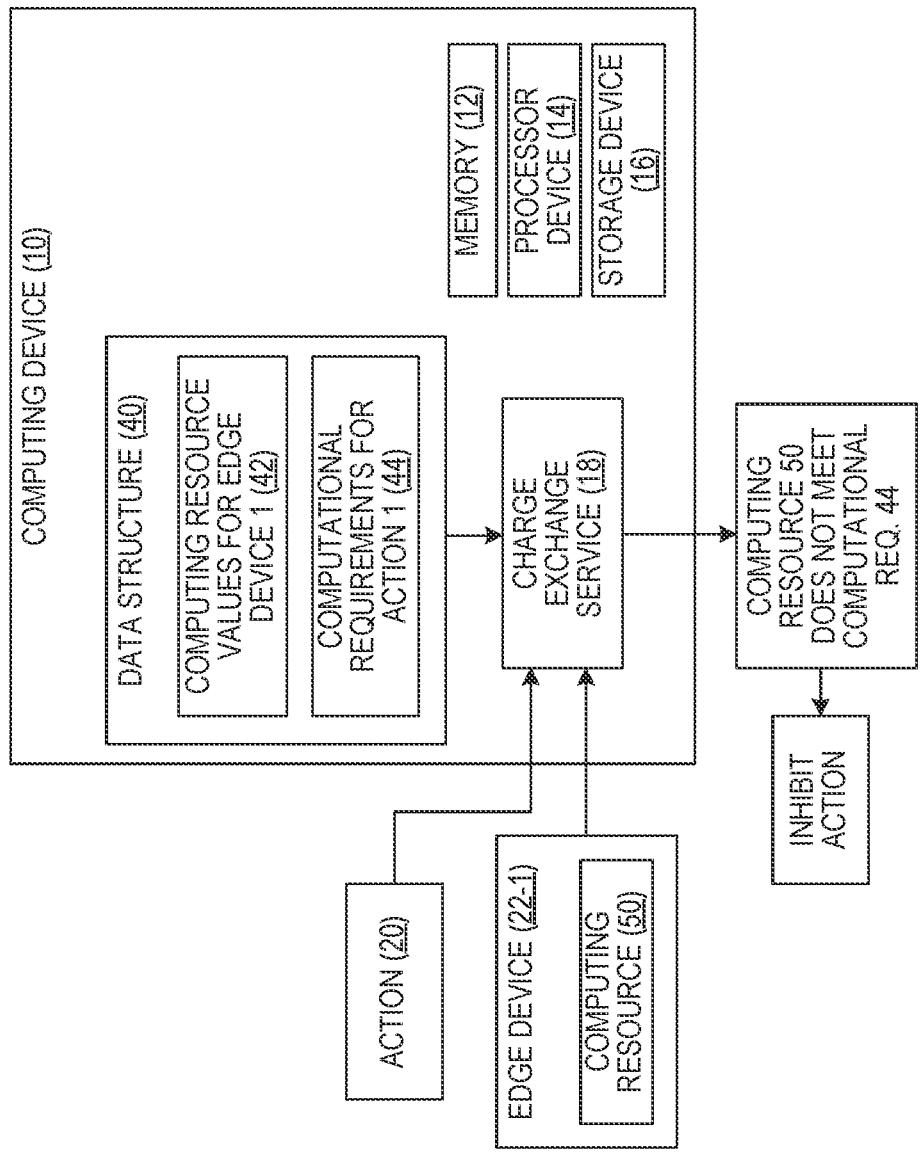
FIG. 8 is a block diagram of the computing device of FIG. 1 for minimum viable charge exchange for service operations in edge devices, according to one example.

FIG. 8 is a block diagram of the computing device 10 of FIG. 1 for minimum viable charge exchange for service operations in edge devices, according to one example. Elements of FIG. 1 are referenced in describing FIG. 8 for the sake of clarity. In the example of FIG. 8, the computing device 10 includes the charge exchange service 18, a system memory 12, and a processor device 14 coupled to the system memory 12. The processor device 14 is to determine that an action 20 should be performed on a first edge device 22-1 operating in a computing system. The processor device 14 is further to access a data structure 40 that identifies values of computing resources 42 of the first edge device 22-1 and computational requirements 44 of performing the action 20 on the first edge device 22-1. The processor device 14 is further to determine, based on the data structure 40, that the first edge device 22-1 lacks a computing resource 50 to meet the computational requirements 44 of performing the action 20 on the first edge device 22-1. The processor device 14 is further to, in response to determining that the first edge device 22-1 lacks the computing resource 50 to meet the computational requirements 44 of performing the action 20 on the first edge device 22-1, inhibit the action 20 from being performed on the first edge device 22-1.

Figure 9:
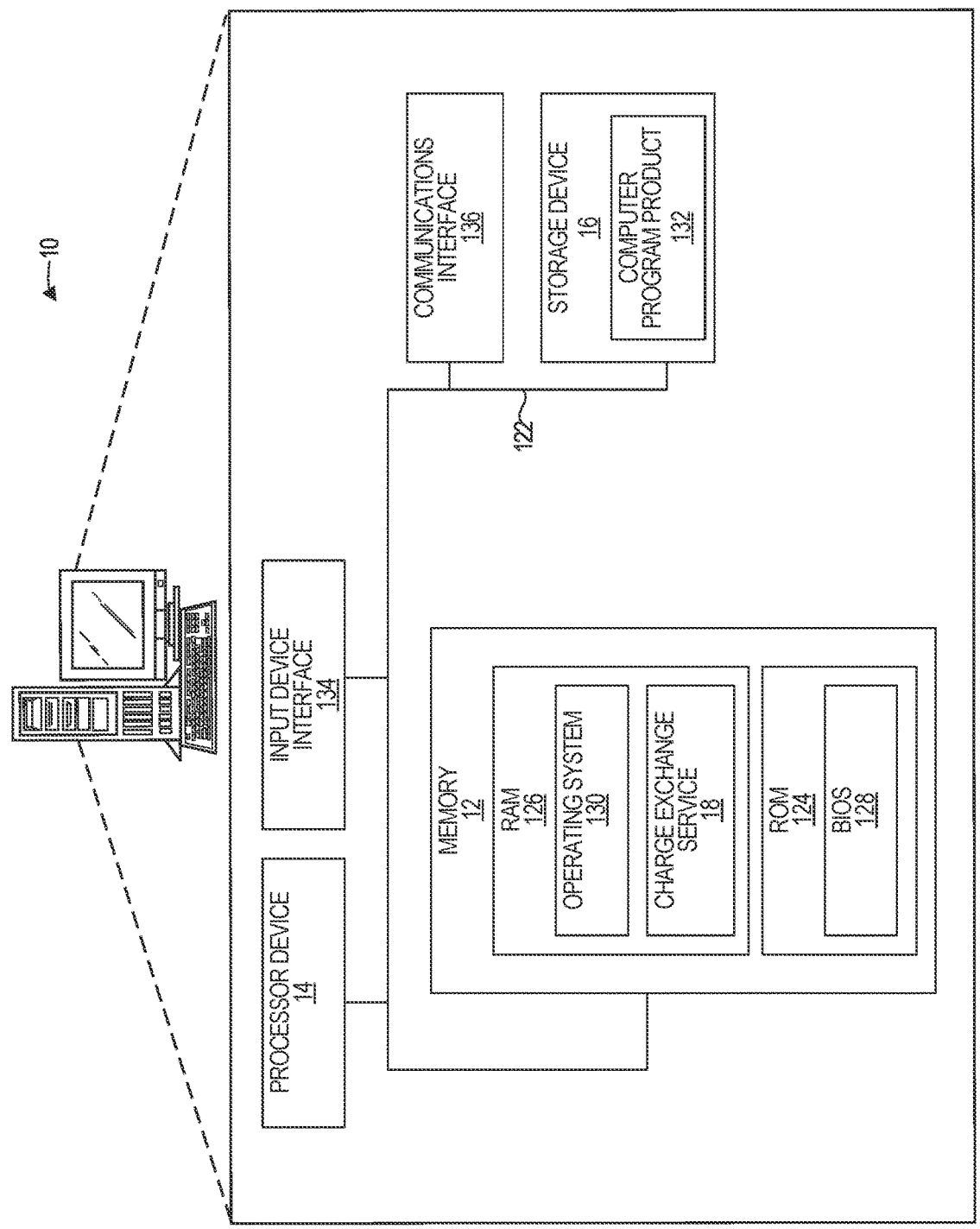
FIG. 9 is a block diagram of a computing device suitable for implementing examples, according to one example.

FIG. 9 is a block diagram of the computing device 10 suitable for implementing examples according to one example. The computing device 10 may comprise any computing or electronic device capable of including firmware, hardware, and/or executing software instructions to implement the functionality described herein. The computing device 10 includes the processor device 14, the system memory 12, and a system bus 122. The system bus 122 provides an interface for system components including, but not limited to, the system memory 12 and the processor device 14. The processor device 14 can be any commercially available or proprietary processor.

The system bus 122 may be any of several types of bus structures that may further interconnect to a memory bus (with or without a memory controller), a peripheral bus, and/or a local bus using any of a variety of commercially available bus architectures. The system memory 12 may include non-volatile memory 124 (e.g., read-only memory (ROM), erasable programmable read-only memory (EPROM), electrically erasable programmable read-only memory (EEPROM), etc.), and volatile memory 126 (e.g., random-access memory (RAM)). A basic input/output system (BIOS) 128 may be stored in the non-volatile memory 124 and can include the basic routines that help to transfer information between elements within the computing device 10. The volatile memory 126 may also include a high-speed RAM, such as static RAM, for caching data.

The computing device 10 may further include or be coupled to a non-transitory computer-readable storage medium such as a storage device 16, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 16 and other drives associated with computer-readable media and computer-usable media may provide non-volatile storage of data, data structures, computer-executable instructions, and the like.

A number of modules can be stored in the storage device 16 and in the volatile memory 126, including an operating system 130 and one or more program modules, such as the charge exchange service 18, which may implement the functionality described herein in whole or in part. All or a portion of the examples may be implemented as a computer program product 132 stored on a transitory or non-transitory computer-usable or computer-readable storage medium, such as the storage device 16, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the charge exchange service 18 in the volatile memory 126, may serve as a controller, or control system, for the computing device 10 that is to implement the functionality described herein.

An operator, such as a user, may also be able to enter one or more configuration commands through a keyboard (not illustrated), a pointing device such as a mouse (not illustrated), or a touch-sensitive surface such as a display device (not illustrated). Such input devices may be connected to the processor device 14 through an input device interface 134 that is coupled to the system bus 122 but can be connected by other interfaces such as a parallel port, an Institute of Electrical and Electronic Engineers (IEEE) 1394 serial port, a Universal Serial Bus (USB) port, an IR interface, and the like. The computing device 10 may also include a communications interface 136 suitable for communicating with the network as appropriate or desired. The computing device 10 may also include a video port (not illustrated) configured to interface with the display device (not illustrated), to provide information to the user.

Individuals will recognize improvements and modifications to the preferred examples of the disclosure. All such improvements and modifications are considered within the scope of the concepts disclosed herein and the claims that follow.

What is claimed is:

1. A method, comprising:
   determining, by a computing device, that an action should be performed on a first edge device operating in a computing system;
   accessing, by the computing device, a data structure that identifies values of computing resources of the first edge device and computational requirements of performing the action on the first edge device, wherein the computational requirements of performing the action comprise an amount of battery required to perform the action, and wherein the values of the computing resources of the first edge device comprise a current battery level of the first edge device;
   determining, by the computing device, that a difference between the current battery level and the amount of battery required to perform the action is less than a minimum threshold battery level for the first edge device;
   determining, by the computing device based on the data structure, that the first edge device lacks a computing resource to meet the computational requirements of performing the action on the first edge device; and
   in response to determining that the first edge device lacks the computing resource to meet the computational requirements of performing the action on the first edge device, inhibiting, by the computing device, the action from being performed on the first edge device.

2. The method of claim 1, further comprising:
   subsequent to inhibiting the action from being performed on the first edge device, determining, by the computing device based on the data structure, that the first edge device has the computing resource to meet the computational requirements of performing the action on the first edge device; and in response to determining that the first edge device has the computing resource to meet the computational requirements of performing the action on the first edge device, permitting, by the computing device, the action to be performed on the first edge device.

3. The method of claim 2, further comprising:
subsequent to permitting the action to be performed on the first edge device, determining, by the computing device, that the first edge device lacks the computing resource to meet the computational requirements of performing the action on the first edge device; and in response to determining that the first edge device lacks the computing resource to meet the computational requirements of performing the action on the first edge device, inhibiting, by the computing device, the action from being performed on the first edge device.

4. The method of claim 1, further comprising:
subsequent to inhibiting the action from being performed on the first edge device, obtaining, from the data structure, the values of the computing resources of the first edge device that include an updated battery level of the first edge device;

determining that a difference between the updated battery level of the first edge device and the amount of battery required to perform the action is below the minimum threshold battery level for the first edge device;

obtaining, from the data structure, values of computing resources of a second edge device that include a current battery level of the second edge device and a minimum threshold battery level for the second edge device;

determining that the current battery level of the second edge device is above the minimum threshold battery level for the second edge device; and causing, by the computing device, the second edge device to share energy from a battery of the second edge device with a battery of the first edge device.

5. The method of claim 1, wherein the action comprises updating one or more of an application, firmware, an operating system, a package, a service, or software on the first edge device.

6. The method of claim 1, wherein the action comprises installing one or more of software and a service on the first edge device.

7. The method of claim 1, wherein the data structure identifies values of computing resources of a plurality of edge devices operating in the computing system and computational requirements of performing actions on the plurality of edge devices.

8. The method of claim 1, wherein the values of the computing resources of the first edge device further comprise quantities of the computing resources of the first edge device.

9. The method of claim 8, wherein the computing resources of the first edge device comprise one or more of CPU cycles, memory available, storage available, load, battery level, and age of the first edge device.

10. The method of claim 1, wherein the computational requirements of performing the action on the first edge device further comprise one or more of CPU cycles, memory, storage, network capabilities, battery level, and time required to perform the action on the first edge device.

11. The method of claim 1, wherein determining that the action should be performed on the first edge device comprises receiving a signal from a server indicating that a new version of one or more of an application, firmware, an operating system, a package, a service, or software is available for the first edge device.

12. The method of claim 1, further comprising:
subsequent to determining that the action should be performed on the first edge device, determining, by the computing device, the values of the computing resources of the first edge device by polling the first edge device; and updating, by the computing device, the data structure with the values of the computing resources of the first edge device from polling the first edge device.

13. The method of claim 1, wherein determining, based on the data structure, that the first edge device lacks the computing resource to meet the computational requirements of performing the action on the first edge device comprises:
obtaining, from the data structure, the values of the computing resources of the first edge device that includes the minimum threshold battery level for the first edge device; and obtaining, from the data structure, the computational requirements of performing the action on the first edge device that includes the amount of battery required to perform the action.

14. The method of claim 1, wherein the minimum threshold battery level for the first edge device comprises a minimum viable battery charge for the first edge device to operate in the computing system.

15. The method of claim 1, wherein determining, based on the data structure, that the first edge device lacks the computing resource to meet the computational requirements of performing the action on the first edge device comprises:
obtaining, from the data structure, the values of the computing resources of the first edge device that include the minimum threshold battery level for the first edge device;

obtaining, from the data structure, the computational requirements of performing the action on the first edge device that include the amount of battery required to perform the action and an amount of battery required to reverse the action; and determining that the amount of battery required to perform the action together with the amount of battery required to reverse the action exceeds the minimum threshold battery level for the first edge device.

16. The method of claim 1, wherein determining, based on the data structure, that the first edge device lacks the computing resource to meet the computational requirements of performing the action on the first edge device comprises:
obtaining, from the data structure, the values of the computing resources of the first edge device that include an age of the first edge device and the current battery level of the first edge device;

obtaining, from the data structure, values of computing resources of a second edge device operating in the computing system that includes an age of the second edge device and a current battery level of the second edge device; and determining, based on the age of the first edge device and the age of the second edge device, that a battery charge of the first edge device decreases at a faster rate than a battery charge of the second edge device.

17. A computing device, comprising:
a memory; and
a processor device coupled to the memory, the processor device to:

determine that an action should be performed on a first edge device operating in a computing system;

access a data structure that identifies values of computing resources of the first edge device and computational requirements of performing the action on the first edge device, wherein the computational requirements of performing the action comprise an amount of battery required to perform the action, and wherein the values of the computing resources of the first edge device comprise a current battery level of the first edge device;

determine that a difference between the current battery level and the amount of battery required to perform the action is less than a minimum threshold battery level for the first edge device;

determine, based on the data structure, that the first edge device lacks a computing resource to meet the computational requirements of performing the action on the first edge device; and in response to determining that the first edge device lacks the computing resource to meet the computational requirements of performing the action on the first edge device, inhibit the action from being performed on the first edge device.

18. The computing device of claim 17, wherein the processor device is further to:

subsequent to inhibiting the action from being performed on the first edge device, determine, based on the data structure, that the first edge device has the computing resource to meet the computational requirements of performing the action on the first edge device; and in response to determining that the first edge device has the computing resource to meet the computational requirements of performing the action on the first edge device, permit the action to be performed on the first edge device.

19. The computing device of claim 17, wherein the processor device is further to:

subsequent to inhibiting the action from being performed on the first edge device, obtain, from the data structure, the values of the computing resources of the first edge device that include an updated battery level of the first edge device;

determine that the updated battery level of the first edge device is below the minimum threshold battery level for the first edge device;

obtain, from the data structure, values of computing resources of a second edge device that include a current battery level of the second edge device and a minimum threshold battery level for the second edge device;

determine that the current battery level of the second edge device is above the minimum threshold battery level for the second edge device; and cause the second edge device to share energy from a battery of the second edge device with a battery of the first edge device.

20. A non-transitory computer-readable storage medium that includes computer-executable instructions that, when executed, cause one or more processor devices to:

determine that an action should be performed on a first edge device operating in a computing system;

access a data structure that identifies values of computing resources of the first edge device and computational requirements of performing the action on the first edge device, wherein the computational requirements of performing the action comprise an amount of battery required to perform the action, and wherein the values of the computing resources of the first edge device comprise a current battery level of the first edge device;

determine that a difference between the current battery level and the amount of battery required to perform the action is less than a minimum threshold battery level for the first edge device;

determine, based on the data structure, that the first edge device lacks a computing resource to meet the computational requirements of performing the action on the first edge device; and in response to determining that the first edge device lacks the computing resource to meet the computational requirements of performing the action on the first edge device, inhibit the action from being performed on the first edge device.

* * * * *